INVENTORS
Ralph C. Hansen and
BY Charles A. Miller, Jr.
Nobbe & Swope
ATTORNEYS

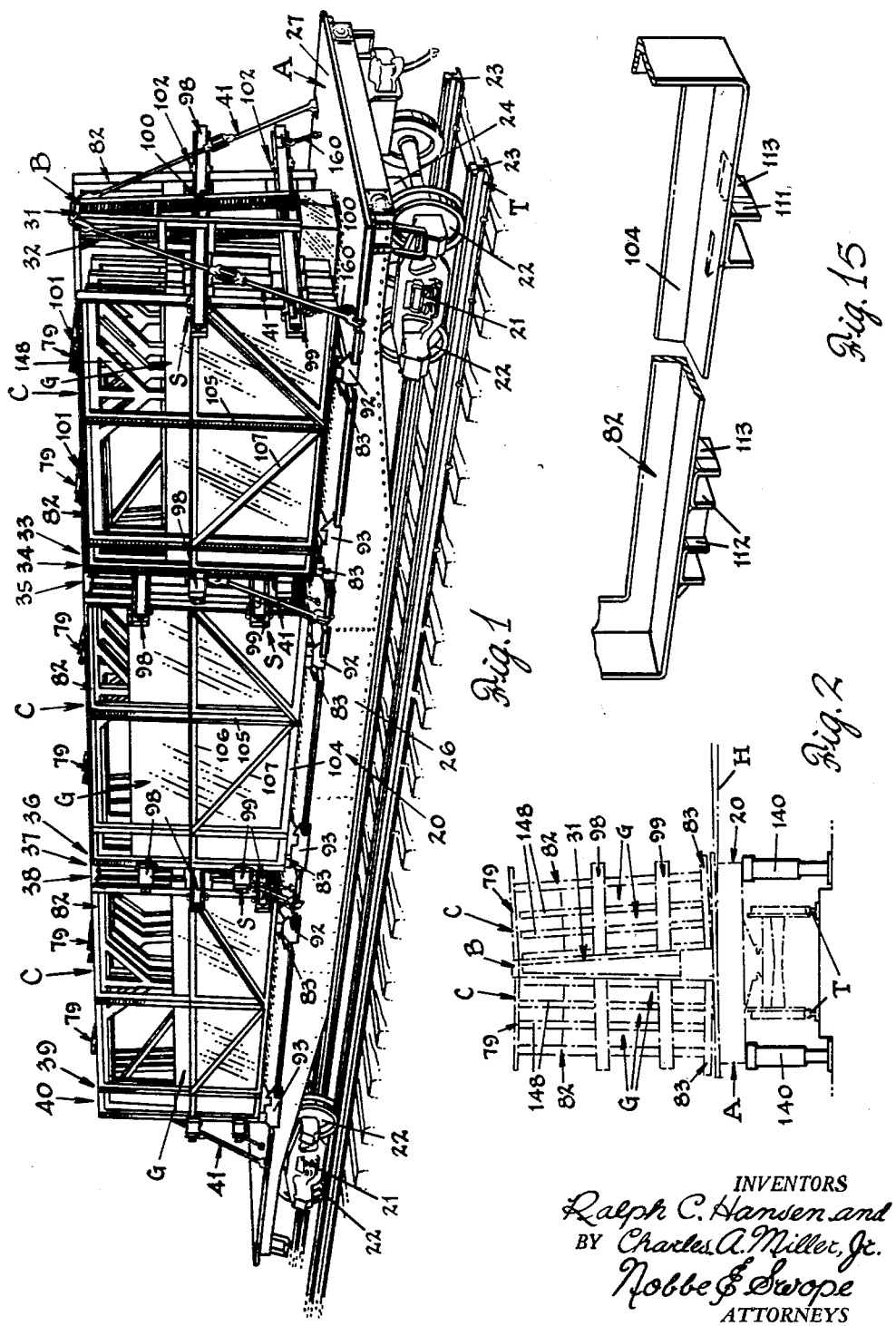

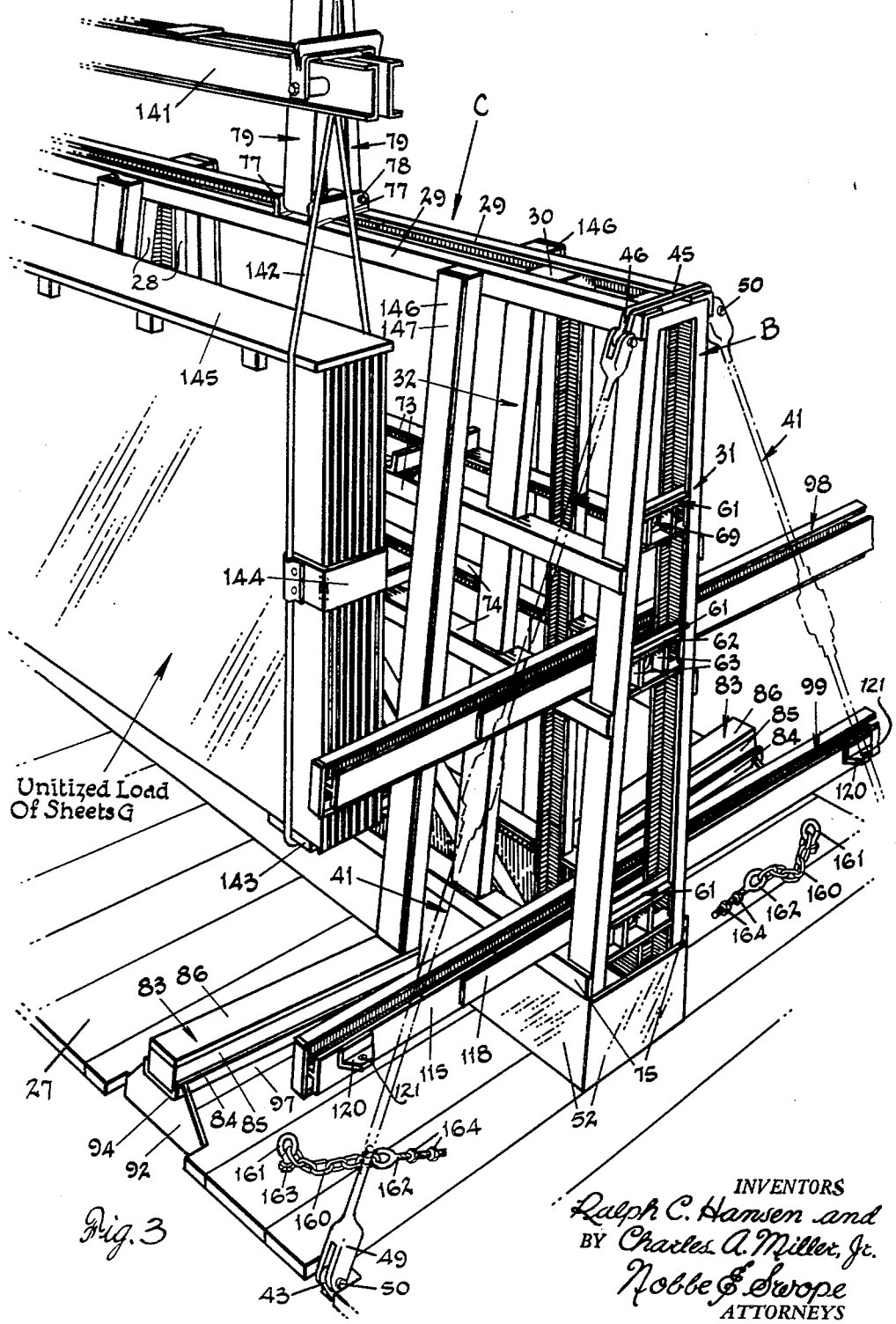

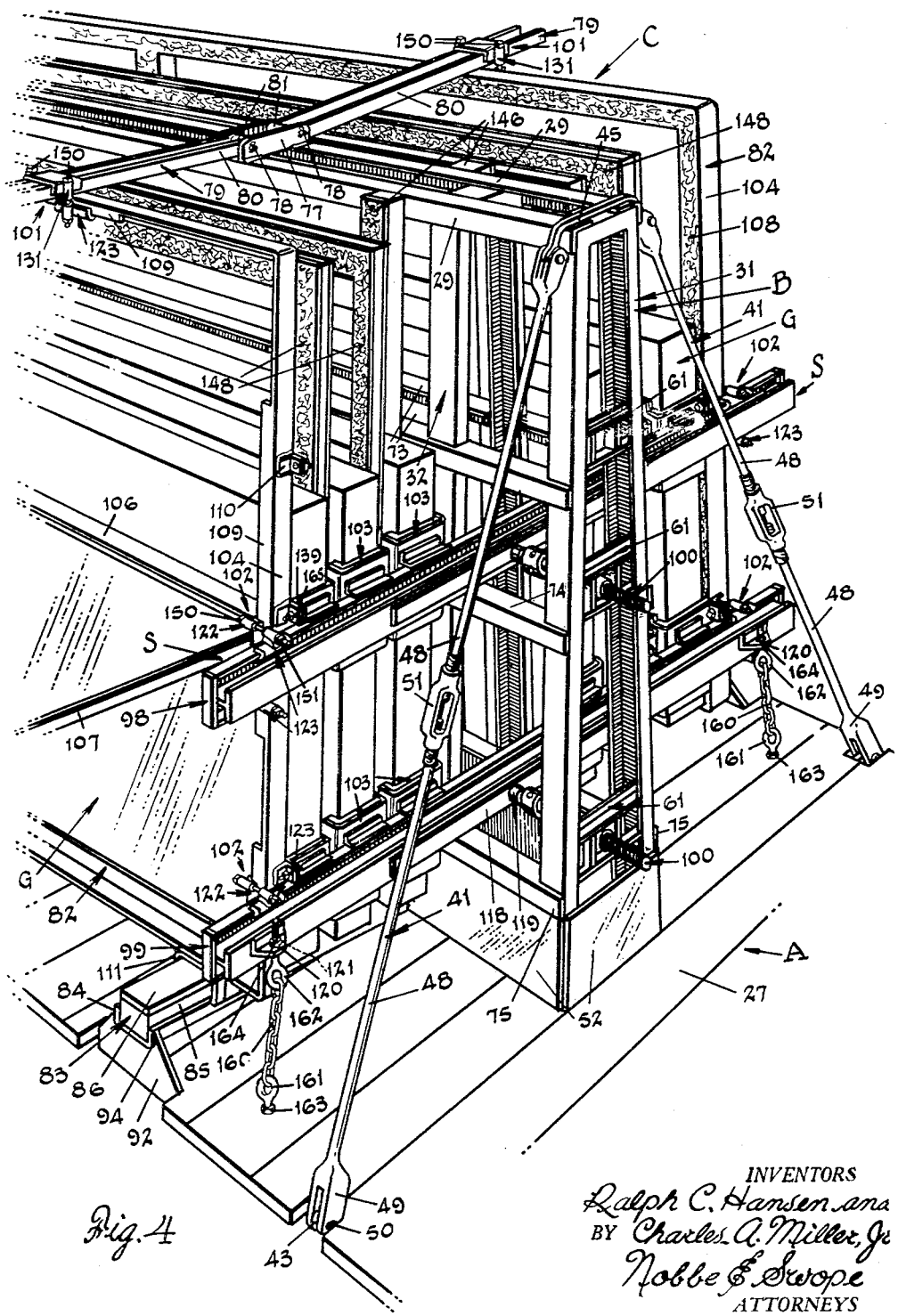

June 14, 1960 R. C. HANSEN ET AL 2,940,402
RAILROAD CARS FOR TRANSPORTING SHEETS OR PLATES
Filed Oct. 23, 1953 7 Sheets-Sheet 6
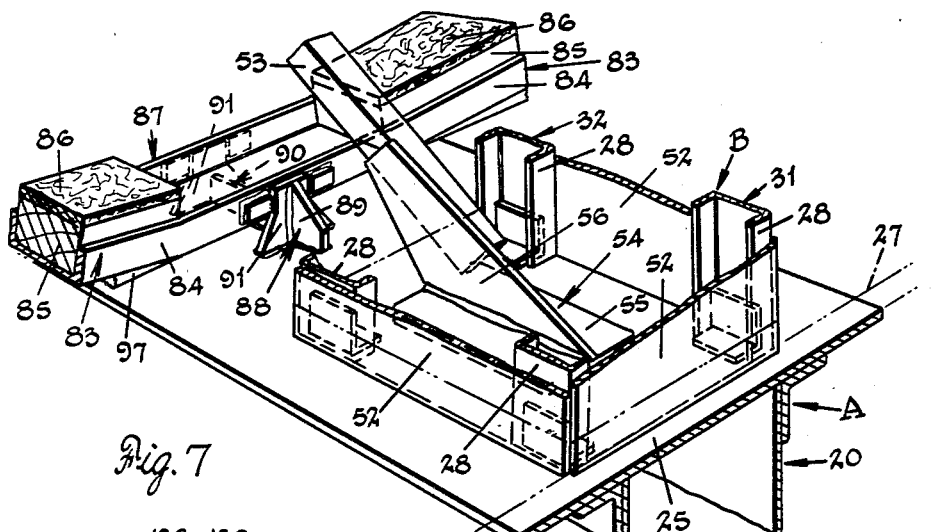
Fig. 7
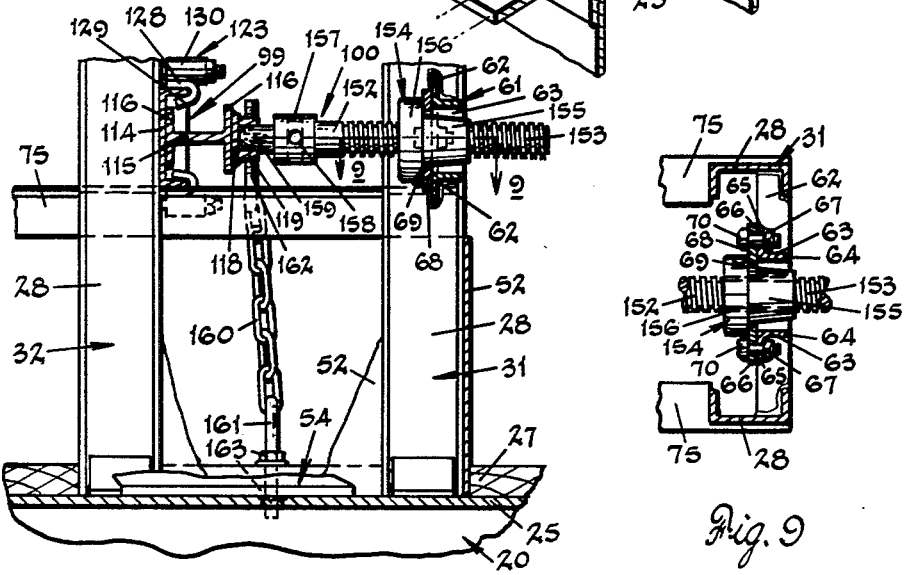
Fig. 9
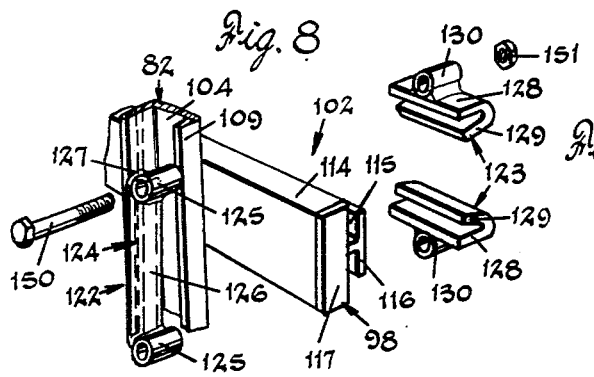
Fig. 8
Fig. 10
INVENTORS
Ralph C. Hansen and
BY Charles A. Miller, Jr.
Nobbe & Swope
ATTORNEYS June 14, 1960 R. C. HANSEN ET AL 2,940,402
RAILROAD CARS FOR TRANSPORTING SHEETS OR PLATES
Filed Oct. 23, 1953 7 Sheets-Sheet 7

INVENTORS
Ralph C. Hansen and
BY Charles A. Miller, Jr.
Nobbe & Swope
ATTORNEYS

United States Patent Office 2,940,402
Patented June 14, 1960

2,940,402

RAILROAD CARS FOR TRANSPORTING SHEETS OR PLATES

Ralph C. Hansen, Toledo, and Charles A. Miller, Jr., Maumee, Ohio, assignors to Libbey-Owens-Ford Glass Company, Toledo, Ohio, a corporation of Ohio Filed Oct. 23, 1953, Ser. No. 387,852

9 Claims. (Cl. 105—367)

This invention relates broadly to the transportation of sheet materials. More particularly, the invention has to do with a novel type and construction of railroad car whereby a maximum load of glass sheets can be transported with a minimum of loss.

Heretofore, when large glass sheets were to be shipped long distances, it has been customary to transport them in conventional box cars. This entails considerable handling since the large sheets, often 6 x 12 feet in size and weighing in excess of one hundred pounds, must be individually loaded and unloaded from a transfer truck to the car and again from the car to a second truck at some distant point. The large dimensions of the glass sheets ordinarily shipped in this manner, in addition to presenting a laborious handling problem, are also extremely difficult to pack advantageously so that only a fraction of the number or tonnage of sheets that can be safely shipped in a box car can actually be shipped therein.

According to the present invention, the laborious handling of the glass sheets and danger to workmen because of possible glass breakage is greatly minimized since the sheets can be loaded or unloaded in groups by means of a crane. Also the sheets in a plurality of groups or "unitized" loads can be firmly secured in position with adequate devices for resisting shifting of the sheets due to the sway or bumping of the railroad car normally experienced in such manner of transportation. It has further been found that the actual, permissible tonnage of glass, carried on the special car of the present invention, can be so greatly increased over what was formerly considered the capacity of a railroad car that the tonnages ordinarily accommodated, for example, in four box-type freight cars can now be handled by only three of the cars to herein be described.

It is therefore a primary aim of this invention to provide a novelly constructed railroad car having a specially mounted glass supporting superstructure equipped with securing means for the transportation of large numbers of glass sheets safely for long distances.

Another object of the invention is the provision of a glass sheet supporting superstructure that is fabricated into an integral part of a railroad car.

Another object of the invention resides in the provision of a glass sheet supporting superstructure, integrally secured to the frame of the wheeled understructure of a railroad flat car and which is equipped with securing or confining means for the glass to firmly position and reduce shifting of the sheets to an absolute minimum during motion of the car.

Another object of the invention is to provide a supporting structure of the above character having positive securing members for holding the glass sheets thereon, said securing members being adapted to easy and rapid installation and removal.

A further object of the invention is to provide a railroad flat car having a glass sheet supporting superstructure adapted to accommodate various thicknesses and/or dimensional sizes of glass sheet.

A still further object is to provide a railroad car having an integrally constructed glass sheet supporting structure on and from which relatively large unitized loads of sheets can be rapidly and easily loaded or unloaded and securely supported.

Other objects and advantages of the invention will become more apparent during the course of the following description when read in connection with the accompanying drawings.

In the drawings, wherein like numerals are employed to designate like parts through the same:

Fig. 1 is a perspective of a railroad car constructed in accordance with the present invention;

Fig. 2 is a diagrammatic end view of the railroad car positioned for loading or unloading of glass sheets;

Fig. 3 is an enlarged perspective of one end of the railroad car when the glass sheets are being either loaded or unloaded;

Fig. 4 is a similar perspective view of the end of the railroad car when the same is loaded with glass sheets;

Fig. 7 is a fragmentary perspective view of the base of the glass sheet supporting structure of the car;

Fig. 8 is a longitudinal vertical section, taken substantially on line 8—8 of Fig. 5 to show an end of the supporting structure;

Fig. 9 is a horizontal detail sectional view taken substantially on the line 9—9 of Fig. 8;

Fig. 10 is an exploded perspective view of certain of the securing members of the structure;

Fig. 15 is a perspective view of a lower corner of one of the glass sheet securing members.

Figure 5:
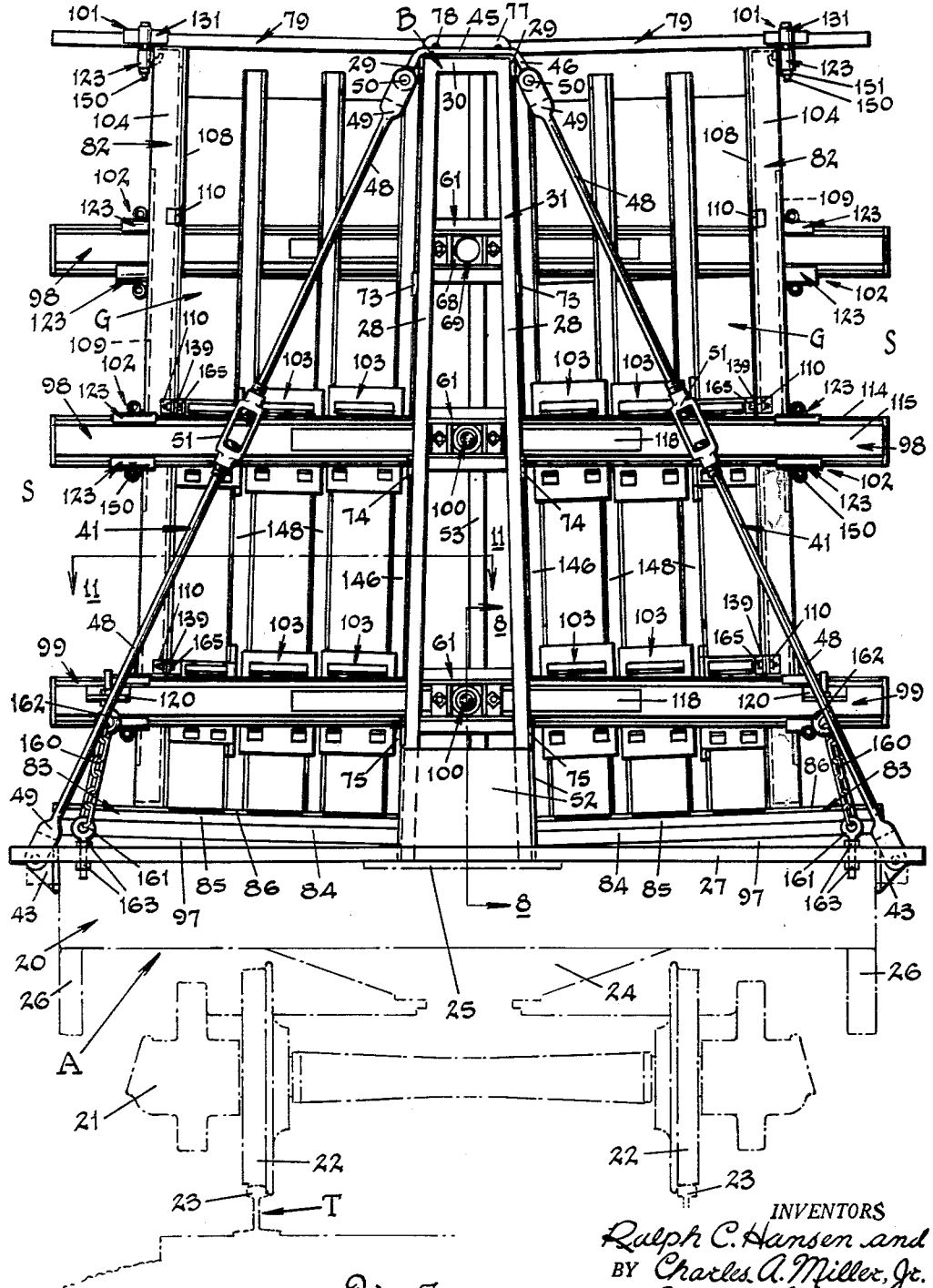
Fig. 5 is an end elevation of the railroad car, conventional details thereof being shown in phantom line.

According to this invention, the typical wheeled understructure of a railroad flatcar is equipped during its construction with an integrally related and especially mounted superstructure that is adapted to receive a plurality of groups or unitized loads of glass sheets or plates. Associated with this superstructure are especially constructed securing members that are operable to firmly hold the loads of glass thereon. This provides a mutually rigid relationship between the superstructure and the car and a releasably rigid relationship between the car, the superstructure and the securing members, so that shifting or jolting of the glass sheets will be reduced to an absolute minimum.

Thus, as shown in Fig. 1 of the drawings, in the practice of our invention, a railroad car has its conventional understructure designated generally by the letter A, equipped, during construction, with a special plate supporting superstructure generally designated by the letter B. This superstructure is divided primarily and longitudinally of the flatcar into unitary sections indicated at C. Each of these sections are intended to carry several unitized loads or stacking units of glass sheets G on each side of the longitudinal axis of the car A.

For this purpose, each of the sections C is individually provided with securing members, generally designated by the letter S in order that the sections can be loaded with stacking units of glass sheets, first along one side of the car, and then on the other side; each section being loaded and secured before proceeding with the loading of a subsequent section. While the dimensional sizes of the sheets may vary as "loads" or units in one section from those in another, it is preferable to maintain a uniformity of size of sheet on one flat-car since the tonnage limit thereon may be more closely controlled and the equilibrium thereof better maintained.

When loading or unloading a car, which procedures are identical except for reverse order of sequence, the car is preferably "blocked," as shown in Fig. 2, in a tilted position with respect to a horizontal plane H, or to the rails of track T, by means of screw or ratchet jacks regularly employed by railroad companies and which are arranged at the corners of the car. While serving to maintain the flat-car stationary, the jacks are also used to raise one side of the car to further incline the groups of glass sheets on the side of the first section to be loaded or unloaded. The jacks are then adjusted to tilt the car in the opposite direction to load or unload groups of glass sheets onto or from the second side of the first section. In this connection, it is to be noted that since a comparatively large number of glass sheets are to be handled as a stacking unit, they are delivered to and removed from the flat-car by means of a crane and the car is initially moved so that one section at one end of the car is substantially centered therebeneath. By means of a cable "sling," the stacking units made up of glass sheets ranging from 24 to 40 in number, may thus be easily, safely and rapidly handled. When the handling operation in the area of one section is completed, the flat-car is advanced, if desired, until a subsequent section is properly positioned with respect to the over-head or power crane.

Referring now more particularly to the drawings, the body 20 of the understructure A, is carried by trucks 21, having pairs of wheels 22, on the rails 23 of track T. The body or frame 20 of the understructure is conventionally supported on the trucks 21 by means of bolsters 24 that are pivotally associated with the trucks and are structurally disposed transversely of the flat-car to support the center sill cover plate 25 and side sills 26 of the frame. Other framing members, such as cross-bearers and longitudinally arranged stringers, while not shown, are obviously provided in the construction of the car to support the planks forming the floor 27 thereof.

*The glass supporting superstructure*

As herein provided, the glass sheet supporting superstructure B is constructed as an integral part of the understructure A in accordance with this invention and is basically built-up from and structurally connected to the metal plate forming the center sill cover plate 25. As shown particularly in Figs. 6 and 7, this structure B is formed by longitudinally arranged upright members or pairs of channels 28 which are disposed at an inwardly inclined angle to the perpendicular or so that the channels of each pair converge and combine to resemble an elongated trapezoid. The pairs of channels are, generally speaking, tied together by their fixed mounting on the sill plate 25 and by a pair of angles 29 secured at their upper ends where the channels are interconnected by an integral web 30.

For purposes to be more fully hereinafter disclosed, the pairs of channels 28 are arranged along the central area of the car directly over the center sill to form the base of each of the sections C and to provide structural supports for the securing members S. Thus when a flat-car is constructed to provide, for example, three sections, the pairs of channels 28 will be located as are generally indicated at 31, 32, 33, 34, 35, 36, 37, 38, 39 and 40. The pairs of channels 32—33, 35—36, and 38—39 will then define the areas of the three sections while the pairs of channels 31, 34, 37 and 40 will serve as the structural supports.

To give stability to the superstructure B, the pairs of channels 31, 34, 37 and 40 are connected to the side plates or sills 26 of the understructure by tie-rods 41. For this purpose the car side-sills 26 are provided with brackets 43, welded or riveted thereon, which have eyes 44. Bars 45 are welded to the angles 29 at the upper ends of the respective pairs of channels 31, 34, 37 and 40 and are formed at their ends to provide downwardly directed portions 46 having eyes 47. The rods 48 forming the tie-rods 41 are equipped at their ends with forks 49 which are connected to the brackets 43 at one end and to the end portions 46 of bars 45 at the other by pins 50. By means of turnbuckles 51 which interconnect the opposed ends of the rods 48, the perpendicular relation of the channels 28 with reference to the floor 27 may be obtained and maintained despite swaying motions of the flat-car while in transit.

Figure 6:
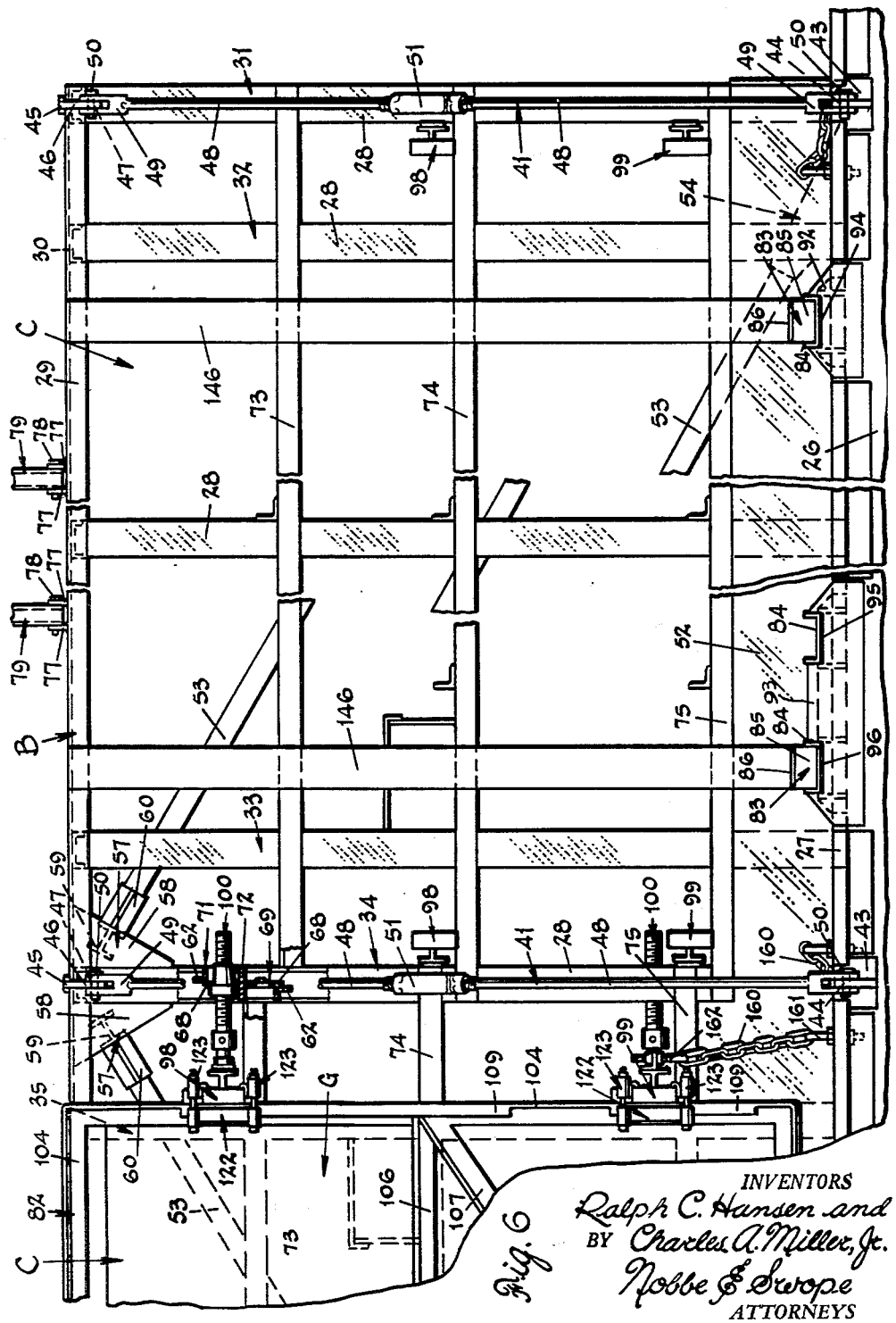
Fig. 6 is a side elevation of one end of the railroad car.
Figure 12:
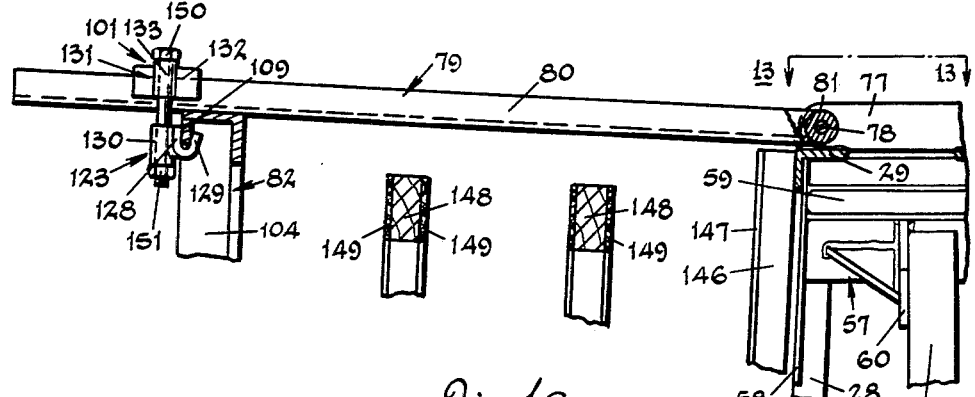
Fig. 12 is a fragmentary detail view of the upper end of the supporting structure.
Figure 13:
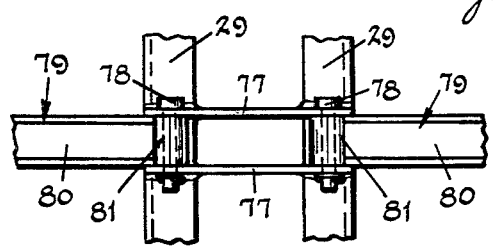
Fig. 13 is a fragmentary plan view of the supporting structure, as indicated by the arrows 13—13 of Fig. 12.

To further reinforce the integral association between the frame 20 of the understructure A and the superstructure B, suitable plates 52 may be affixed, by welding or riveting, to the sill plate 25 and upwardly along the lower extremities of each of the pairs of channels. Also suitable braces may be located between the said center sill plate and the upper ends of the channels. As herein shown, a brace 53 is arranged in each of the sections C. At its lower end, each brace is secured to the sill plate 25 by means of a mounting bracket 54 welded to said sill and having a base 55 and a vertically disposed flange 56 to which the brace end is attached (Fig. 7). As best seen in Figs. 6 and 12, the upper end of each brace is affixed to a weldment 57. This part comprises a pair of triangular gussets or plates 58 and a lateral, horizontally disposed H-shaped member 59. The gusset plates are secured at or along their upper edges to the adjacent surface of an angle 29 and along a second edge to an adjacent channel 28. The lateral members 59 are secured at their ends to the inner surfaces of the plates 58 and carry at substantially right angles thereto a flange or outwardly directed extension 60 to which the braces 53 are attached.

The pairs of channels 31 and 40 are further provided with weldments 61 which are vertically spaced from each other according to the desired spacing to be utilized by the several elements of the securing members S. Each weldment 61 (Figs. 8 and 9) is formed by a pair of horizontally disposed angles 62 that are affixed at their ends to the inner surfaces of the webs of the channels. Vertically arranged between the angles 62 are a pair of angles 63 that are located so that each will have a leg surface 64 equally spaced from the perpendicular axis of the pair of channels or the flat-car generally. The opposite legs 65 of angles 63 are provided with openings 66 and welded-on nuts 67, aligned with the openings, on their inner surfaces. A plate 68 having a relatively large annular opening 69 is secured against the outer surfaces of the legs 65 by means of bolts 70 threaded into nuts 67.

The pairs of channels 34 and 37 are similarly provided with such weldments but in these instances, the weldments are constructed to provide support for two plates 68 one above the other. Thus as shown particularly in Fig. 6, the weldment 71 is formed by upper and lower angles 62 and a center bar 72 and the pairs of angles 63 are affixed to the opposed surfaces of the angles 62 and bar 72. According to this manner of assembling the parts, however, the angles 63 are so arranged the one plate 68 will be supported on one side of the weldment while the second plate 68 is supported on the other. This permits the related parts of the securing members, to be described, to be adequately spaced from each other and so as to be operable with the particular section with which they are to be associated.

Figure 11:
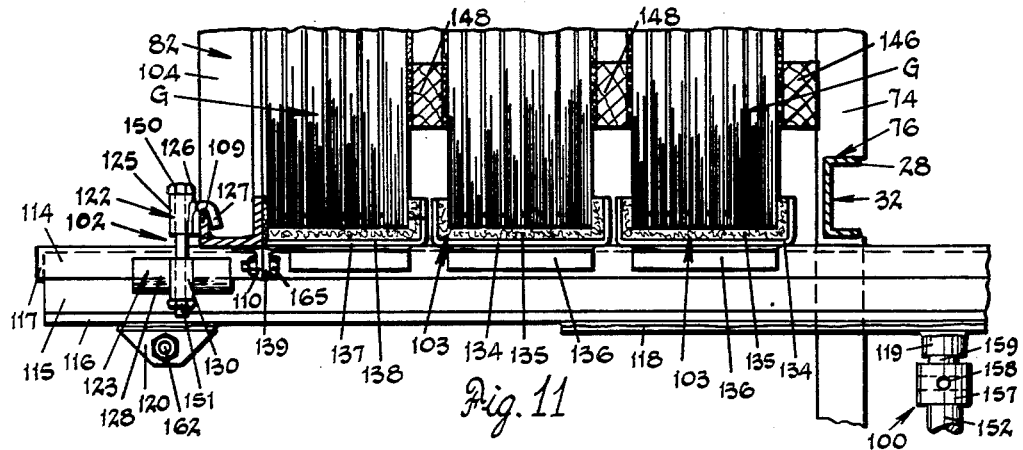
Fig. 11 is a horizontal section, taken substantially on line 11—11 of Fig. 5, to illustrate several groups of glass sheets when secured in position on the supporting structure.

Since each section is substantially a duplicate of the other sections, attention will be more specifically to the construction of one of the end sections C as is shown particularly in Figs. 4, 5 and 6. As previously set forth, this section may be formed by the pairs of channels 32—33 which are related in horizontally spaced relation to adjoining pairs of channels 31 and 34. The several pairs of channels are further interconnected, in addition to the angles 29, by pairs of angles 73, 74 and 75 that are individually arranged in horizontal alignment and by pairs in vertically spaced relation according to the areas of the stacking units of sheets G to be engaged by the securing members S. As herein shown, each of the pairs of angles 73, 74 and 75 are provided with notches 76 (Fig. 11), in which the channels 28 are located so that the substantially vertically disposed legs of the angles may be welded in surface contact with the webs thereof.

Equally spaced from the pairs of channels 32—33 and fixedly secured to the pair of angles 29 located at the tops thereof are pairs of vertically disposed plates 77. The plates 77 are provided with openings that receive pins 78 on which are pivotally carried bars or gate-keepers 79. These may be formed of channels 80 at one end of which a short sleeve or tube 81 is secured as by welding. The bars or keepers 79, while one section of the car is being loaded or unloaded, are swung into an upwardly directed position as shown in Fig. 3 or, when the section is completely loaded, are brought to a substantially horizontal position in which they are disposed to engage glass sheet sustaining or holding frames or gates 82, as shown in Figs. 4 and 5. The gates 82 are component parts of the securing members S.

Arranged transversely between the sides of the understructure A and in spaced relation to the pairs of channels 32—33 (and likewise 35—36 and 38—39) are base supporting members or so-called "bottom pads" 83. These are formed by a channel 84 having wood filler blocks 85 located therein and a layer of padding, such as, for example, rubber, felt or like material, 86 on the upper surface of the block. More particularly, the channels 84 have a central portion 87 which is intended to be supported substantially horizontal. This central portion 87 is supported on and fixedly secured in a weldment bracket 88. The bracket (Fig. 7) is formed by a vertically disposed plate 89 which is welded to the center sill 25 and has a notched central portion 90 for receiving the channel 84. The plate 89 is located in or parallel to the longitudinal axis of the flat-car and has flanges or cross-plates 91 located at substantially right angles thereto. The cross-plates 91 are secured to the plate 89 at the opposite ends of the notch 90. The central portion 87 of the channel 84 is thus supported in the notch 90 and secured as by welding to the cross-plates 91.

The outer ends of the channels 84 are located in and supported by plates 92 and 93 which are secured to the metal sheets 26 forming the side sills of the car frame 20. The plate 92 is spaced from an adjoining pair of channels, for example the pair 32, to support a bottom pad in the vicinity of one lower corner of the glass sheets and for this purpose is provided in its upper edge with a notch 94 for receiving the channel 84 of the bottom pad. Preferably the plate 93 is, in each of the sections C, provided with double notches 95 and 96, as is shown in Figs. 1 and 6, for location of the bottom pads 83 according to the length of the glass sheets to be loaded. A channel 84 is located in each of the notches 95 and 96 and the block 85, for supporting the opposite lower corner of the sheets, is positioned in one or the other of the channels 84 depending on the length of the sheets. In the triangular area formed by the channels 84, the floor of the car 27 and the plates 92 and 93, wedge-shaped members of wood 97 may be located to serve as supports for the bottom pads 83 when they are loaded with glass sheets. Outwardly of the central portion 87, the channels are slightly bent upwardly to provide a pair of connected downwardly converging supporting members, and so that the padded upper surfaces 86 will be disposed in a plane substantially at right angles to the inclined plane of the channels 28. This assures that when glass sheets are placed on the bottom pads 83 in a unit, they will automatically lean inwardly and each sheet of the unit will be suitably positioned with respect to the adjacent sheets.

The securing members

Collectively, the securing members S together with the frames or gates 82 include end-beams 98 and 99, screw-jacks 100, clamping devices, generally designated 101 and 102, and cushioning pads 103. Generally speaking, when one side of a section is loaded, a gate 82 is placed against the outer surface of the last unit of glass sheets, and clamps 101 employed to releasably secure the gate, at its upper end, to the associated gate-keeper 79. The car is then tilted at an opposite angle to the horizontal and the second side of the section is loaded and a gate 82 placed and clamped thereagainst. While the car is so tilted, or when it is returned to a substantially horizontal plane, the end-beams 98 and 99 are brought against the sides of the gates and positively positioned by means of the screw-jacks 100 after which the gates and end-beams are rigidly secured together by means of clamps 102.

More specifically, the gate 82, as herein shown is formed of a structural angle as a rectangular frame 104 having vertically disposed braces 105, a horizontal brace 106 and angularly disposed braces 107. The leg of the angle intended to face the glass sheets is covered by a suitable padding 108 while the other leg is provided with bars 109 for clamping purposes. The bars 109 are arranged at suitable areas along the sides and the top of the gate. Along the side surfaces of the gate there are also a plurality of angles or clips 110 intended for securing purposes.

As shown in Fig. 15, the bottom portion of the gate 82 is provided with notched members or short channel pieces 111 and 112 which are located transversely to the facing position of the frame and near the lower corners thereof. The channel 111 adjoining one corner is reinforced by gussets 113 and is intended to fit over the channel 84 of a bottom pad 83 in the notch 94 of plate 92 while the channels 112, also equipped with gussets 113, are located near the opposite frame corner so as to engage the channels 84 of the bottom pads 83, which are supported in the notches 95 and 96 in the plate 93. The channels 111 and 112 are adapted to loosely engage the sides of the channels 84 and thereby minimize sliding movement of the gate when supported on the bottom pads. By so restricting movement of the gate 82, motion of the same against the glass sheets will be minimized thereby reducing the "shift" when the flat-car bodily is bumped or jerked in being normally transferred in a yard or while in transit.

The end-beams 98 and 99 are especially constructed from channels and H-shaped members. As clearly shown in Fig. 8, the end-beam generally is formed by a channel member 114 and the H-shaped member 115, the innermost leg 116 of which is secured as by welding to the web of the channel. The ends of the channel may be closed for reinforcement by plates 117 which are also adapted to prevent outward sliding of the clamping devices 102. On the outer surface of the outermost leg portion 116, a bracing plate 118 is secured and on this plate at the medial point of the beam generally is secured an annular socket member 119. The end-beams 98 and 99 differ in only one detail of construction and that resides in the provision of angles 120 on beams 99 which are provided with openings 121. In positioning the end-beams, the beams 99 are located lowermost, and whatever number of beams 98 that are required (usually one) are arranged thereabove.

The clamps 102 are shown in perspective in Fig. 10 and comprise one element 122 adapted to engage a bar 109 on the gate 82 and a pair of elements 123 adapted to engage the channels of end-beams 98 and 99. Thus the clamping element 122 has a V-shaped body 124 at the end of which in transverse relation to its length are attached sleeves 125 on leg portion 126; the leg 127 serving as the gate engaging means on the bars 109. The clamping elements 123 are similarly formed to provide legs 128 and 129 to engage the leg edges of the channels 114 but the sleeves 130 thereon are secured, for example, to the center area of the leg 128.

The clamping devices 101 are more adapted to secure and rigidly hold together the gates 82 and the gate-keepers 79. For this purpose, the clamp 131 may have a channel shaped body 132 having sleeves 133 secured to the vertical legs thereof.

Figure 14:
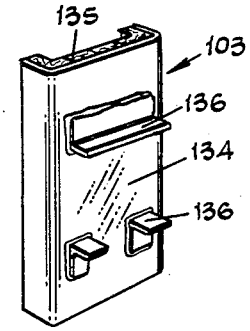
Fig. 14 is a perspective view of a spacer pad.

Between the ends of each stacking unit of glass sheets and the end-beams 98 and 99, when arranged in assembled order, are positioned a number of cushioning members designated previously by the numeral 103. These may be formed of U-shaped or channeled walls 134 with padding layers 135 secured to the inner surfaces thereof (Fig. 14). On the outer surface of the web of the channel, pieces of angles 136 are secured to loosely support the cushioning members on the end-beams 98 or 99 and to prevent movement thereagainst. For the purpose of adding further rigidity to the relation of the gate to the outermost group of glass sheets, certain of the cushioning members 137 are formed substantially L-shaped having a wall 138 covered by padding 135 and, at one corner on the longer leg of the L-shape, an angle or clip 139.

*Loading or unloading operations*

In loading a flat-car, constructed in accordance with our invention, or in the subsequent unloading thereof, the car is usually directed onto a railroad siding which may be within the production confines of a plant and above which a bridge crane is mounted for movement in the immediate vicinity. Preferably the car is then located so that it will be fairly well centered beneath the crane. It is then secured or blocked from movement and simultaneously tilted to the desired angle to the use of jacks as indicated at 140 (Fig. 2). To convey the glass sheets in a unit, the hook of the crane is equipped with a cable sling, such as is shown in Fig. 3. This may comprise an upper cross-beam 141 at the ends of which the looped slings 142 are connected. As herein shown, the slings 142 at their lower ends are provided with a bar or wooden block 143 and midway between the beam 141 and the block with a band 144. When intending to lift a group of sheets from a transfer buck and to transfer them to the flat-car, a spacer member 145 having depending lugs is placed on the top edges of the glass sheets. This not only protects the top edges from chipping and the tautness of the slings but also holds the sheets closely together at their upper ends.

In order to transfer a stacking unit of sheets to the car, the crane is operated to lower the cable-sling until the blocks 143 can be located beneath the lower corners of the sheets and the band 144 stretched across their side edges. When the group of sheets have been lifted and delivered to a point above the flat-car, they are lowered until they are supported at their lower edges on the padded surfaces of the base members or bottom pads 83. Further lowering of the sling permits the unit to be inclined inwardly (as manually directed) and to be supported on one surface by several supports 146, formed of wood, and which are faced with padding 147. The supports 146 are located on the pads 83 at their lower ends and suitably secured to the angles 29 at their upper ends. Between the first and second units of sheets, a separator or spacer frame 148 is interposed. This frame, as herein shown, is provided on each side with padding 149 and is employed to serve as a spacer between the individual units of glass sheets to be loaded on one side and the other of each section C.

Thus the loading arrangement outwardly from the upright structural members 28, and angles 73, 74 and 75 consists of the supports 146, a stacking unit of glass sheets G, a separator 148, a second unit of sheets G and so on as required. A gate 82 is then lifted by the crane and lowered into position against the outer surface of the outermost unit of sheets and so that the channels 111 and 112 on the bottom thereof will engage the channels 84 of the bottom pads 83. When further lowered, the gate assumes a corresponding inclined position against the glass. The gate-keepers 79 are now swung downwardly until they rest on the top surface of the gate.

The gate 82 and keepers 79 are rigidly secured together by clamping member 131 which is fitted over the keepers (Fig. 12) and the pair of clamps 123 which are positioned to "hook" onto the bar 109 of the gate. By means of bolts 150 inserted in the sleeves 130 and 133 of the associated clamps, and nuts 151 threaded thereon, the clamps are drawn tightly together and thereby effect a rigid relation between the gate and the gate-keepers. The second side of the same section C is now similarly loaded after the car has been suitably tilted by the jacks 140.

The end-beams 98 and 99 which have been supported, out of the way, on angles 74 and 75 and between pairs of channels 31—32 and 33—34 are now moved into engagement with the sides of the gate. The end-beams, positioned at the opposite sides of the gate 82, are intended to exert considerable end-wise pressure to establish a vise-like relation for holding the gate stationary. Before the end-beams have been fully urged against the sides of the gates, the cushioning and protecting members 103 are located on the beams, by means of the angles 136 for support and so that the U-shaped padding layer 135 will fit loosely over the outer surfaces of each unit of glass sheets. The end-beams are then moved firmly against the gate surfaces.

To urge the beams against the gate, screw-jacks 100 are positioned between said beams and the pairs of channels 31 and 34. As shown in Fig. 8, the jacks 100 consist of a rod 152 having a square-threaded portion 153, formed in the major portion of its length, and a nut 154. The nut has a reduced, tapered portion 155 that is received in the openings 69 of plates 68 carried by weldments 61 or 71. The larger body portion 156 of the nut will thus abut the plate and serve as a base against which pressure can be exerted. The rod 152 is also provided with an enlarged annular portion 157 which is cross-drilled as at 158 and outwardly of the enlarged portion has a semi-spherical or tapered end 159 formed thereon.

The screw-jack 100 is positioned by inserting the end of the threaded portion 153 and tapered portion 155 of the nut 154 through the opening 69 in plate 68 when the nut is located near the inner end of the threads. The rounded end 159 is placed in the socketed member 119 on the associated end beam and when the rod 152 is rotated by means of a stake or pin inserted in the drill holes 158, the end 159 will force the beam bodily against the gate of the immediate section as the body 156 of the nut 154 is forcibly urged against the plate 68. This operation is repeated for each of the end-beams 98 or 99 and at each end of the gates 82.

In viewing Fig. 6, it will be noted that in locating the screw-jacks 100 in the plates carried by the weldments 71, those jacks associated with the end-beams of the first section C will be located in the openings 69 of the lower plate 68, in each case, while the jacks 100, as shown, associated with the ends of the second section C will be located with respect to an upper plate 68. As herein shown, the pairs of angles 73, 74 and 75 forming a part of the second section are spaced above those angles of the first section to suitably support the related end-beams in alignment with the upper plates 68 on each weldment 71. In the third section C of the railroad car, this situation is again reversed and the relation of the parts, namely of the angles 73, 74 and 75 to the plates 68 on the pairs of channels 37 and 40, is identical to the arrangement of the same parts hereinbefore described in connection with the first section C.

When the end-beams 98 and 99 have been so positioned against the sides of the gate 82, the clamping devices 122 and 123 are placed as shown in Fig. 4. The legs 128 and 129 of clamps 123 will then be located to engage and "straddle" each leg of the channel portion 114 of the end-beams 98 and 99 while the legs 126—127 of clamp 122 will likewise straddle the adjacent bar 109 on the gate. Bolts 150 are inserted through the aligned sleeves 125 and 130 and by means of nuts 151 will draw the clamping devices together and establish a rigid connection between the gate and the end-beams.

The end-beams 99 are now releasably connected to the floor 27 or the body of the flat-car generally. This operates to "hold" the end-beams 99 in a fixed position relative to the car. The end-beams are so held, at each end of the respective and associated gates 82 by means of chains 160 attached at their ends to eye-bolts 161 and 162. The eye-bolts 161 are located in the floor 27 and secured by nuts 163. The opposite eye-bolts 162 are equipped with nuts 164 and are insertable into the openings 121 of clips or angles 120 at the opposite ends of end-beams 99. In so locating the eye-bolts 162, the outermost nut 164 is removed; the bolt is located in the opening 121, and the nut is replaced. By adjusting the positions of the nuts, the angle will be clamped therebetween after the desired amount of tension has been created in the chains 160. Bolts and nuts 165 are located in the clips 110 of gates 82 and clips 139 of cushioning pads 137 to secure the pads and the stacking units of sheets engaged thereby to the gate. The unitized loads of glass sheets G are now firmly secured for safe transportation.

This firm securement is obtained by the manner in which the component parts of the securing members S are formed and their inter-relation. Thus when the gates 82 are lowered into position, the channels 111 and 112 engage the sides of the bottom pads 83 to resist end-wise sliding of the gates as caused by longitudinally created and extending shocks absorbed by the car. The gates are also held by the clamping devices 123 and 131 at their upper ends in a secured relation to the gate-keepers 79. When the end-beams 98 and 99 are firmly positioned against the gates, a vise-like or end-wise thrust is imposed on the gates by the jacks 100 which are further aided to hold the same by the several clamping devices 122 and 123. The lower end-beams 99 are further "anchored" to the car by means of the chains 160 and eye-bolts 161 and 162. Thus there is a rigid, though temporary, relation established between the flat-car and the glass sheets, and by the securing members, to the end that the end-wise movements of the car or transverse swaying movements cannot produce undesired movement of the glass sheets above an absolute and predictable minimum. The connection through the chains 160, the beams 99, and the clamping devices 122 together with the channels 111 and 112 on the gate 82, positively restrains each gate from endwise motion and further operates to "pull" the same firmly down onto the bottom pads 83. The end-wise motion of the gate is also restricted by the end-thrust exerted on the gate by the several end-beams 98 and 99 and as created by the screw-jacks 100. Also the tendency of the gates to "rock" outwardly during swaying motion of the car is minimized if not eliminated by the clamping devices 122 and 123.

The units of glass sheets G are accordingly held safely against the outer surfaces of the structure B and are spaced apart by the separator frames 148. This loaded relation of the groups is maintained by the gates 82 which have been secured as described above. Any tendency of the sheets to shift end-wise beyond the predictable minimum is prevented by the end-beams 98—99 through the cushioning pads 103.

When the car is to be unloaded, it is suitably located with respect to a crane and blocked in such position. The clamps 122 and 123 are then removed from their positions on the end-beams 98 and 99 and the gates 82 in one section C and the screw-jacks 100 are operated to release the pressure against the gates.

The bolts and nuts 165 are removed from the clips 110 and 139. The nuts 164 on eye-bolts 162 are also released to allow said bolts to be removed from the clips 120 of the associated end-beams 99. The beams 98 and 99 may be moved, for example, in the first section C, from a position of proximity to the pairs of channels 32 and 33 to an outer position against pairs of channels 31 and 34 (Fig. 3), the cushioning pads 103 having been first removed from between the beams and the units of glass. The gates 82 on the opposite sides of the section C are now held only by their respective gate-keepers 79 and the clamping devices 123 and 131 on the side to be first unloaded are removed, to release the associated gate 82 for removal. The gate-keeper 79, associated therewith, is then swung upwardly and out of the way. Thus while unloading the stacking units of glass sheets from one side of a section C, the gate-keeper 79 on the other side will prevent the associated gate 82 from falling outwardly with a consequent outward swinging or falling of the glass sheets held thereby.

It is to be understood that the form of the invention herewith shown and described is to be taken as a preferred embodiment of the same, but that various changes in the shape, size and arrangement of parts may be resorted to without departing from the spirit of the invention or the scope of the subjoined claims.

We claim:

1. In a railroad car for transporting sheets or plates the combination with a wheeled understructure including a frame; of a plate-carrying superstructure mounted on said frame and comprising upwardly converging upright members for supporting surfaces of plates to be transported, downwardly converging base members at either side of said upright members for supporting the lower edges of said plates; and means for securing said plates in position against said upright members including frame type gates having portions interfitting with said base members, swingably mounted gate-keepers pivoted on said uprights, and clamp means for locking said gates and said keepers together to confine plates between said uprights and said gates.

2. In a railroad car for transporting sheets or plates the combination with a wheeled understructure including a frame; of a plate-carrying superstructure mounted on said frame and comprising upwardly converging upright members for supporting surfaces of plates to be transported, downwardly converging base members at either side of said upright members for supporting the lower edges of said plates; and means for securing said plates in position against said upright members including gates adapted to rest on said base members and against said plates, and end beams mounted for movement toward the side edges of said plates and against said gates to confine plates between said uprights and said gates and against endwise movement.

3. In a railroad car for transporting sheets or plates the combination with a wheeled understructure including a frame; of a plate-carrying superstructure mounted on said frame and comprising upwardly converging upright members for supporting surfaces of plates to be transported, downwardly converging base members at either side of said upright members for supporting the lower edges of said plates; and means for securing said plates in position against said upright members including gates adapted to rest on said base members and against said plates, gate-keepers for connecting said gates to said uprights, end beams mounted for movement toward the side edges of said plates, and means carried by said uprights for moving said end beams toward contact with the edges of said gates.

4. In a railroad car for transporting sheets or plates the combination with a wheeled understructure including a frame; of a plate-carrying superstructure mounted on said frame and comprising upwardly converging upright members for supporting surfaces of plates to be transported, downwardly converging base members at either side of said upright members for supporting the lower edges of said plates; and means for securing said plates in position against said upright members including gates, end members mounted for movement toward the edges of said plates and the edges of said gates, means carried by said end members for receiving the marginal edges of said plates, gate-keepers for connecting said gates and said uprights, and means carried by said uprights for forcing said end members toward the edges of said plates and said gates to confine said sheets between said gates and said uprights and against endwise movement.

5. In a railroad car for transporting sheets or plates the combination with a wheeled understructure including a frame; of a plate-carrying superstructure mounted on said frame and comprising upwardly converging upright members for supporting surfaces of plates to be transported, downwardly converging base members at either side of said upright members for supporting the lower edges of said plates; and means for securing said plates in position against said upright members including gates adapted to rest on said base members and against said plates, gate-keepers for connecting said gates to said uprights, end beams mounted on said uprights for movement toward the ends of said plates and said gates, means for forcing said end beams into contact with the ends of said gates, a floor on said understructure, means for anchoring said end beams to said floor, and means for tightening said anchoring means.

6. In a railroad car for transporting sheets or plates the combination with a wheeled understructure including a frame; of a plate-carrying superstructure mounted on said frame and comprising upwardly converging upright members for supporting surfaces of plates to be transported, downwardly converging base members at either side of said upright members for supporting the lower edges of said plates; and means for securing said plates in position against said upright members including gates adapted to rest on said base members and against said plates, gate-keepers swingably mounted on said uprights, end members also mounted on said uprights for movement toward the edges of said plates and said gates, means for clamping said gate-keepers to said gates, and means for clamping said end members to said gates to confine said plates between said uprights and said gates and against endwise movement.

7. In a railroad flatcar for transporting sheets or plates having a wheeled understructure and a frame; a plate-carrying superstructure rigidly connected to the frame; said superstructure comprising, support means for supporting the lower edges of the plates, a plurality of uprights and end beams extending horizontally and movably mounted on at least one of said uprights; a gate adapted to fit against said plates; and securing means for securing said gate to the end beams of said plate carrying superstructure.

8. In a railroad flatcar for transporting sheets or plates having a wheeled understructure and a frame; a plate-carrying superstructure rigidly connected to the frame; said superstructure comprising, support means for supporting the lower edges of the plates, a plurality of uprights, gate-keepers movably mounted on said uprights and end beams extending horizontally and movably mounted on at least one of said uprights; a gate adapted to fit against said plates; and securing means for securing said gate to the end beams of said plate carrying superstructure.

9. In a railroad flatcar for transporting sheets or plates having a wheeled understructure and a frame; a plate-carrying superstructure rigidly connected to the frame; said superstructure comprising, support means for supporting the lower edges of the plates, a plurality of uprights, gate-keepers pivotally mounted on said uprights, a first set of end beams extending horizontally and mounted on one of said uprights and a second set of end beams extending horizontally and movably mounted on another of said uprights; a gate adapted to fit against said plates; first securing means for securing said gate to the first and second set of end beams of said plate carrying superstructure; and second securing means for securing said gate to the gate-keepers of said plate carrying superstructure.

References Cited in the file of this patent

UNITED STATES PATENTS

| | | |
|---|---|---|
| Re. 19,580 | Rothholz | May 21, 1935 |
| 500,860 | Daniels | July 4, 1893 |
| 793,374 | Hope | June 27, 1905 |
| 1,165,163 | Evans | Dec. 21, 1915 |
| 1,213,032 | Smith | Jan. 16, 1917 |
| 1,616,605 | Campbell | Feb. 8, 1927 |
| 1,785,982 | Scott | Dec. 23, 1930 |
| 1,836,362 | Crowley | Dec. 15, 1931 |
| 1,940,186 | Romine | Dec. 19, 1933 |
| 1,994,717 | Koepke et al. | Mar. 19, 1935 |
| 2,056,815 | Wynn | Oct. 6, 1936 |
| 2,100,971 | McDonald | Nov. 30, 1937 |
| 2,169,677 | Burrell | Aug. 15, 1939 |
| 2,507,769 | Churchill | May 16, 1950 |
| 2,518,624 | Kraft | Aug. 15, 1950 |